United States Patent [19]
Sekharipuram et al.

[11] Patent Number: 6,040,416
[45] Date of Patent: Mar. 21, 2000

[54] MELT POLYMER SYNTHESIS OF POLY ETHER PHOSPHINE OXIDES

[75] Inventors: Venkateshwaran N. Sekharipuram, Roanoke; Beverly Sue Mecham, Blacksburg; Atul Bhatnagar, Roanoke; James E. McGrath, Blacksburg, all of Va.

[73] Assignees: Johnson & Johnson Vision Products, Inc., Roanoke; Virginia Tech Intellectual Properties, Inc., Blacksburg, both of Va.

[21] Appl. No.: 09/252,296

[22] Filed: Feb. 18, 1999

[51] Int. Cl.$^7$ .................................................. C08G 79/02
[52] U.S. Cl. .......................... 528/168; 528/167; 528/169
[58] Field of Search ................................... 528/167, 168, 528/169

[56] References Cited

U.S. PATENT DOCUMENTS

| | | | |
|---|---|---|---|
| 4,492,805 | 1/1985 | Besecke et al. | 568/12 |
| 4,754,225 | 6/1988 | Minuhin | 328/133 |
| 5,079,333 | 1/1992 | McGrath et al. | 528/168 |
| 5,143,988 | 9/1992 | Wang et al. | 525/471 |
| 5,387,629 | 2/1995 | McGrath et al. | 524/190 |
| 5,407,528 | 4/1995 | McGrath et al. | 156/643 |
| 5,691,442 | 11/1997 | Unroe et al. | 528/125 |

OTHER PUBLICATIONS

R.N. Johnson et al., Poly(aryl Ethers) by Nucleophilic Aromatic Substitution. I. Synthesis and Properties, *J. Polymer Science,* Part A–1, vol. 5, pp. 2375–2398 (Sep. 1967).

D.J. Riley et al., Synthesis and Characterization of Flame Resistant Poly(Arylene Ether)s, *Polymer Eng. & Science,* vol. 37/No. 9, pp. 1501–1511 (Sep. 1997).

Hans R. Kricheldorf et al., New Polymer Syntheses: II. Preparation of Aromatic Poly(ether Ketone)s From Silylated Bisphenols, *Polymer,* vol. 25, No. 8, pp. 1151–1156 (Aug. 1984).

Hans R. Kricheldorf, Synthesis of Aromatic Polyethers From 2,6–difluorobenzophenone and Various Silylated Diphenols, *Die Makromolekulare Chemie, Rapid Communications,* 10, pp. 41–45 (Jan. 1989).

*Primary Examiner*—Terressa M. Boykin
*Attorney, Agent, or Firm*—Darby & Darby

[57] ABSTRACT

A melt polymerization method for producing poly(arylene ethers phosphine oxide)s suited to optical applications comprising reacting a trimethyl silyl derivative of bisphenol and an activated aromatic dihalide, wherein either reactant is a phosphine oxide, is provided.

17 Claims, No Drawings

MELT POLYMER SYNTHESIS OF POLY ETHER PHOSPHINE OXIDES

FIELD OF THE INVENTION

The present invention is directed to the synthesis of poly(arylene ether phosphine oxides) (PEPO) by melt polymerization. The methods of the present invention reduce color bodies and other contaminants that may compromise these materials. The methods of the present invention also reduce effluent waste streams from the production of such materials.

BACKGROUND OF THE INVENTION

Poly arylene ethers are tough, rigid, flame-retardant engineering thermoplastics with high glass transition temperatures. Consequently, these materials are well suited to optical applications. These polymers also display better resistance to basic environments than do other higher temperature thermoplastics such as polyimides.

Poly ether phosphine oxides are particularly well suited for optical applications because of their high refractive indices. PEPOs are amorphous polymers due to the presence of flexible ether linkages in the polymer backbone and large phenyl groups pendant to the phosphorus. These features increase the solubility of PEPOs in many common solvents.

Although the melt synthesis of poly(arylene ethers) has been described, PEPOs have been synthesized in solution by either a strong base route or a weak base route. For example, UDEL® (Amoco), a polyether sulfone, has been synthesized by the strong base route by Johnson et al., J. Polymer Sci, Part A-1, 5, 2375 (1976). Riley et al., Polym. Eng. Sci. 37, 1507–1511 (1997), describes the synthesis of PEPOs by the weak base route. This method results in products with impurities, the removal of which requires additional purification steps.

Synthesis of PEPOs by a solution method can require about twenty hours to obtain a polymer of 30,000 g/mole. Insoluble salt by-product of the weak base route, such as, potassium fluoride, must be filtered out before the polymer is precipitated. Residual salt that is left in the polymer can have a detrimental effect on the transparency of films by causing haze.

The solvents used in solution methods are another source of contamination because of degradation and side reactions at temperatures above about 150° C. If amide solvents, such as, N, N-dimethylacetamide and N-methylpyrrolidinone, which are used in solution synthesis can be avoided, non-yellowing properties of the polymer will be enhanced. Solvents are a further concern because of their potential environmental impact and the hazards of handling flammable materials.

SUMMARY OF THE INVENTION

The present invention provides a method for producing poly ether phosphine oxides. The method comprises, consists essentially of, and consists of melt polymerizing reactants comprising, consisting essentially of, and consisting of (i) a trimethyl silyl derivative of a bisphenol and (ii) an activated aromatic dihalide; wherein (i), (ii), or (i) and (ii) is a phosphine oxide.

DETAILED DESCRIPTION OF THE INVENTION AND PREFERRED EMBODIMENTS

The present invention provides rapid, environmentally safe methods for preparing poly ether phosphine oxides through melt synthesis. These methods do not require polymer purification. The reactants are polymerized in the melt phase, avoiding the need for any solvents. Because there is no need for any supporting media or solvents, the polymer product is as pure as the starting materials. Furthermore, any condensation by-product is produced as a gas that is easily removed from the reactor. Theoretically, the polymer product can be transferred directly from a reactor to a final mold for, for example, ophthalmic lens production, increasing the economic efficiency of the lens manufacturing process.

Trimethylsilyl derivatives of bisphenols are used as a first reactant in the present invention. The trimethylsilyl derivative may be prepared from bisphenols, for example, as described by Kircheldorf et al., Polymer, 25:1151 (1984) and Kircheldorf et al., Makromol. Chem. Rapid Commun., 10:41–45 (1989). Suitable bisphenols include, but are not limited to, hydroquinone; 4-4'-oxydiphenol; bisphenol A; biphenol; 4-4'-bis(hydroxy phenyl) sulfone; 4,4'-bis(hydroxy phenyl) phenyl phosphine oxide; 4,4'-bis(hydroxy phenyl) sulfide; 6F bisphenol; and combinations of the foregoing.

The second reactant of the present melt polymerization is an activated aromatic dihalide. Suitable activated aromatic dihalides include, but are not limited to, bis(4,4'-fluorophenyl)phenyl phosphine oxide (BFPPO) in a monomer grade purity, 4,4'-dichloro diphenyl sulfone (DDS), and combinations thereof at a weight ratio of BFPPO:DDS ranging from about 100:1 to about 5:95.

The reaction of the present invention is performed in the melt with the temperature during the reaction raised to about 50 to about 75 ° C. above the $T_g$ of the polymer product in order to maintain the reaction system in a molten condition. The reaction of the present invention is preferably performed in the presence of a catalyst. Suitable catalysts include, without limitation, metal fluorides such as cesium fluoride, potassium fluoride, and the like. Preferably, cesium fluoride is used. The catalyst is used in catalytically effective amounts of about 0.1 to about 1 mole percent of the reactants. The melt polymerization of the present invention can achieve high molecular weight in times that are typically about 3 to about 5 times faster than that for solution polymerization.

The incorporation of a trimethyl silyl derivative of a monophenyl ensures end-group control. Suitable monophenyls include, but are not limited to, silylated 4-cumylphenol and silylated phenylethynylphenol, and combinations of the foregoing.

Stoichiometric offset of the difunctional reactants ensures molecular weight control. For example, the final molecular weight can be predicted using Carother's Equation. Both the general form and the monofunctional encapform of the equation can be employed to determine the stoichiometric offset of the monomers. A sample calculation is illustrated in section B below. Preferably, the molecular weight ranges from about 15,000 to about 30,000 g/mol.

The polymers produced by the methods of the present invention can be doped with metal salts such as, $CoCl_2$ or $FeCl_2$. These metal-doped polymers have reduced dispersion properties and, therefore, have small differences in refractive indices in the visible light spectrum such as blue and red visible lights.

The following examples illustrate the invention without limitation.

Procedures a. Gel Permeation Chromatography (GPC)

Number average molecular weight and molecular weight distribution were measured on a Waters 150C ALC/GPC chromatograph equipped with a differential refractive index detector and a Viscotek Model 100 viscometer connected in parallel. Samples of 15–17 mg were dissolved in NMP with 0.025% $P_2O_5$ to a concentration of approximately 3 mg/mL. The liquid phase was filtered through 0.5 microns PTFE filters prior to analysis.

b. Differential Scanning Calorimetry (DSC)

DSC was performed on a Perkin-Elmer DSC 7 series instrument. The samples were cold pressed and secured in crimped aluminum pans. During the first scan to rid the samples of any physical aging, the samples were heated from about 50 to about 300° C. at about 10° C./min and quench cooled. Again, the samples were heated from about 50 to about 300° C. at about 10° C./min, and data was collected to determine the glass transition temperature (Tg).

c. Thermogravimetric Analysis (TGA)

TGA was carried out in air on the Perkin-Elmer TGA 7 series thermal analyzer. The 5–8 mg samples were cold pressed from powders and heated from about 30 to about 800° C. at about 10° C./min. A temperature versus weight percent plot was generated to determine the 5% decomposition temperature.

d. Proton ($^1$H) Nuclear Magnetic Resonance (NMR)

Proton ($^1$H) NMR spectra was measured on a Varian 400 MHz instrument. Samples were prepared in 5 mm tubes using 0.100 g of solid and 0.7 mL $CDCl_3$ or deuterated DMSO depending on the solubility of the material being analyzed. For liquids, samples were prepared using 0.2 mL liquid with mL $CDCl_3$.

e. Carbon ($^{13}$C) Nuclear Magnetic Resonance (NMR)

Quantitative $^{13}$C NMR spectra was obtained using a Varian NMR spectrometer at a frequency of 100 MHz. Samples were prepared with 0.300 polymer and 2.0 mL $CDCl_3$ in 10 mm tubes.

EXAMPLE 1

Melt Polymerization of Bis A PEPO and 6F Bis PEPO

Melt synthesis of Bis A PEPO and 6F BisPEPO was conducted by the silylation route based on bisphenol A or 6F bisphenol and bis(4-4'-fluorophenyl)phenyl phosphine oxide (BFPPO) with cesium fluoride catalyst.

Two monofunctioning endcapping reagents, silylated 4-cumylphenol and silylated phenylethynylphenol were also used.

A. Monomers, Apparatus and Silylation of Monomers and Encappers

Phenol functional groups on the bisphenol monomers, Bisphenol A and 6F Bisphenol, and the monofuntional encappers, 4-cumyl phenol and phenylethynylphenol, were silylated with hexamethyldisilazone.

Bisphenol A was dried at about 80° C. under 10 torr to 100 millitorr vacuum for 16 hours before reaction. A three-necked 500 mL, round-bottomed flask equipped with a magnetic stirrer, condenser and nitrogen inlet served as the reactor. All joints were sealed with PTFE tape. A silicon oil bath heated on a hot plate/stirrer with an OMEGA® temperature controller held the oil bath temperature at 110° C. 20 g (0.876 moles) of bisphenol A were added to the flame-dried apparatus, followed by 40 mL of toluene to dissolve the bisphenol A in a 50% solids solution. 2 moles of hexamethyldisilazanes (plus a 10% excess to ensure complete reactions), were added to every two moles of phenol functional unit. 38.8 mL (0.1840 moles) of hexamethyldisilazane were added to the toluene/bisphenol A mixture. After addition of all the reagents, the reactor was immersed in the heated oil bath. The nitrogen was turned on low flow to prevent the toluene from escaping out the top of the condenser. After about 4–5 minutes of vigorous stirring, the bisphenol A dissolved to provide a homogeneous solution. The reaction was allowed to proceed for about 24 hours.

The reaction's progress was monitored by proton nuclear magnetic resonance spectroscopy ($^1$H NMR). The absence of a phenolic proton (9 ppm) verified that all phenolic groups were silylated. $^1$H NMR showed that the silylation reaction was 100 percent complete in approximately 6 hours. The reaction mixture was rotary evaporated at 70° C. to remove the remaining toluene and then distilled at 120 to 130° C. under 300 millitorr vacuum to collect the silylated products. The silylated monomers and endcappers were kept in an anhydrous environment under nitrogen. All starting materials were crystalline solids. The silylation reaction yields silylated products that are clear, viscous liquids.

BFPPO of monomer grade purity was dried for 24 hours at 80° C. under vacuum before the reaction and used without further purification. The catalyst, CsF, was stored in an anhydrous environment without further drying or purification.

All polymerizations were conducted in 250 mL two-necked round-bottom flask equipped with a metal shaft stirrer, a gas inlet, and a gas outlet/vacuum port. All joints were greased as little was possible to avoid contaminating the reaction. Agitation was modulated with a variac con-

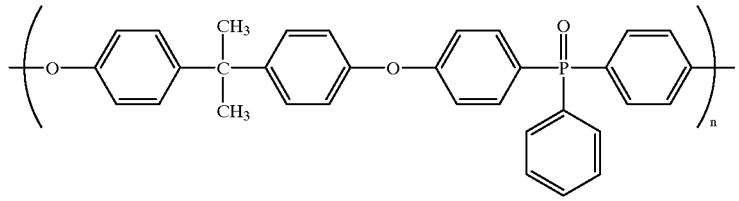

nected to the stirrer motor. The reactor was immersed in a salt bath (7% $NaNO_2$, 43% $KNO_3$, 50% $NaNO_2$) which was heated on a hot/plate stirrer. The bath temperature was controlled by an OMEGA® electronic temperature controller equipped with a J-type thermocouple. The controller monitored the bath temperature with the thermocouple and metered the hot plate current accordingly. During the temperature ramping step of the reaction, the reactor was purged with argon. A low flow of argon removed the trimethylsilylfluoride from the reactor and kept oxygen out of the vapor space. In the vacuum step, the gas outlet served as the vacuum port and the argon inlet was sealed.

B. Molecular Weight Control—Offset Stoichiometry

The molecular weight of the polymers was controlled using Carother's Equation. Both the general form and the monofunctional endcap form of the equation were employed to determine the stoichiometric offset of the monomers. The reactant amounts for a 30,000 g/mol polymer with a repeat unit molecular weight of 502.54826 g/ml is shown below.

$$N_a = \text{moles of Si-BisA}$$

$$N_b = \text{moles of BFPPO}$$

$$X_n = \frac{\text{molecular weight of polymer}}{\text{molecular weight of repeat unit}}$$

$$= \frac{30{,}000 \text{ g/mol}}{502.54826 \text{ g/mol}} = 59.6958 = \frac{1+r}{1-r}$$

$$r = \frac{N_a}{N_b} = 0.9670 = \frac{N_a}{\dfrac{10 \text{ g BFPPO}}{314.2707 \text{ g/mol}}}$$

$$N_a = 0.03077 \text{ moles Si-BisA}$$

$$= 11.4670 \text{ g Si-BisA}$$

BFPPO of monomer grade purity was used in excess to ensure that the polymer chains have terminal fluorine groups which are expected to be more stable than terminal siloxy groups. The catalyst concentration was calculated on a mole percent basis on silylated Bisphenol A (Si—Bis A). The calculation for 0.3 mole percent CsF is shown below.

$$0.03077 \text{ moles Si-BisA} \times \frac{0.3 \text{ mole \%}}{100} = 9.231 \times 10^{-5} \text{ moles CsF} \times 151.9 \text{ g CsF/mol}$$

$$= 0.0140 \text{ g CsF}$$

C. Polymerization—Synthesis of a 30,000 g/mol Bis A PEPO

The synthesis outline is illustrated below:

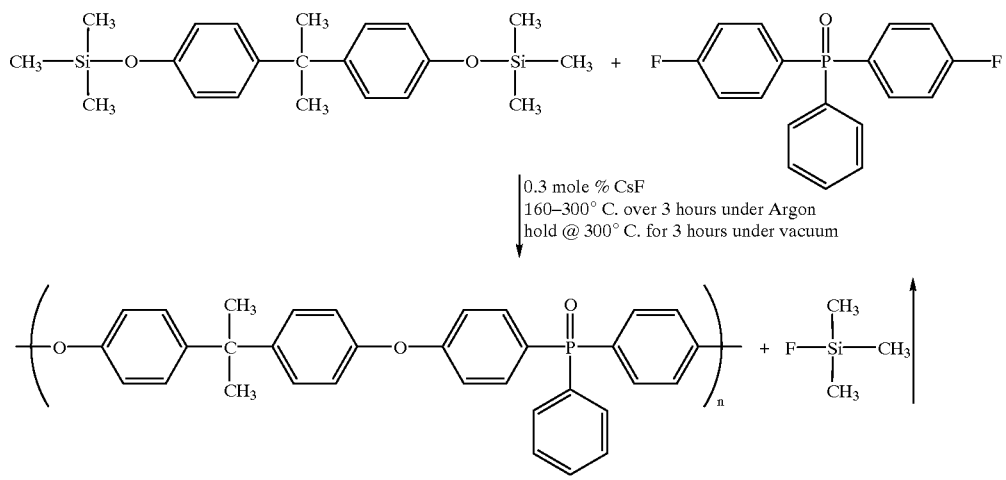

11.4670 g (0.03077 moles) of silylated bisphenol A (Si—Bis A) prepared in section A were added to the flame-dried reactor. The Si—Bis A was added by syringe to the tared reactor on the balance to measure the exact weight. Based on the amount of Si—Bis A, the quantity of BFPPO of monomer grade purity needed to produce the desired molecular weight was calculated using Carother's Equation. 10.0000 g (0.03182 moles) of BFPPO were weighed in an aluminum foil pan. A piece of weighing paper served as a funnel to load the BFPPO into the reactor. After the BFPPO was added, both the aluminum foil pan and weighing paper were weighed to find the grams of BFPPO remaining. This amount was subtracted from the initial measurement to find the precise moles of BFPPO in the reaction mixture. Finally, 0.0149 g (9.231×10$^{-5}$ moles) CsF were added to the BFPPO and Si—Bis A mixture. Because CsF is extremely water sensitive, the weighing step and the addition to the reactor were carried out quickly resulting in the weight differing by 0.5–1 mg from the calculated amount.

Once all reactants were added to the reactor, the joints were sealed with a small amount of high-vacuum grease and the argon was turned on medium flow. The flask was immersed in the salt bath at about 160° C. and allowed to purge for 10 minutes. After applying heat and slowly stirring for 3–4 minutes, the BFPPO melted giving a low viscosity homogeneous solution. After the initial 10 minute purge, the salt bath temperature was increased to about 160° C. to about 300° C. over 3 hours. During the temperature ramp, small bubbles were generated on the catalyst at about 190° C. As bubbling became more vigorous, trimethylsilylflouride gas was visible in the vapor space. The bubbles increased in size and number until about 225 to about 230° C. At this time, about 1 hour into the reaction, the solution viscosity increased rapidly and formed a foam. The foam became very viscous, and stirring was slowed and eventually stopped when the polymer wrapped around the stir rod.

Once the reaction showed signs of slowing and had reached temperatures of about 270° C. to about 280° C., the foam began to subside allowing intermittent stirring. After the foam had subsided, and the reaction was at about 280° C. to about 290° C. the argon inlet was sealed and the reactor was evacuated to remove all of the trimethylsilylfluoride gas. The vacuum routinely reached pressures of 200 millitorr. Once the reaction was under full vacuum, the bath temperature was held at about 300° C. for two hours while slowly stirring the polymer. No more bubbles were visible in the melt at this time signaling complete reaction.

After driving the reaction to completion, the reactor was left under vacuum and the salt bath was removed. Once the polymer was cooled to room temperature, the vacuum was removed and 100 mL of N,N-dimethylacetamide (DMAc) were added to dissolve the polymer in a 20% solids solution. Once dissolved, the polymer was precipitated in 2L of 85/15 deionized water/acetic acid solution in a high speed blender. The polymer was collected by vacuum filtration and stirred in 5L of deionized water for 2–3 hours to remove all of the acetic acid. Again, the polymer was collected by vacuum filtration and dried for 24 hours under vacuum at room temperature then 24 hours under vacuum at about 150 to about 170° C. depending on the polymer molecular weight.

D. Endgroup Incorporation

Another form of the Carother's Equation was used to control the molecular weight of the encapped polymers. The calculations are as follows. First, the monomer stoichiometry is offset for the desired molecular weight:

$N_a$ = moles of Si-BisA $N_b$ = moles of BFPPO $$X_n = \frac{\text{molecular weight of polymer}}{\text{molecular weight of repeat unit}}$$

$$= \frac{30{,}000 \text{ g/mol}}{502.54826 \text{ g/mol}} = 59.6958 = \frac{1+r}{1-r}$$

$$r = \frac{N_a}{N_b} = 0.9670 = \frac{N_a}{\frac{10 \text{ g BFPPO}}{314.2707 \text{ g/mol}}}$$

$N_a$ = 0.03077 moles Si-BisA

= 11.4670 g Si-BisA

Next, the molar ratio of the monomers is reversed and the encapper equation is used to find the amount of encapper that should be used to give the desired endgroups.

$N_A$ = moles of BFPPO $N_B$ = moles of Si–BisA $N_{B'}$ = moles of Si–4–cumylphenol $r = \dfrac{N_A}{N_B + 2N_{B'}}$

= 0.9670

$= \dfrac{0.03182 \text{ moles BFPPO}}{0.03077 \text{ moles Si–BisA} + 2N_{B'}}$ $N_{B'}$ = 0.00321 moles Si–4–cumylphenol = 0.6812 g Si–4–cumyphenol = 0.00107 g moles Si–4–cumyphenol = 0.2270 g Si–4–cumylphenol The reaction and isolation procedures for endcapped polymers are identical to those in the polymerization procedure above.

E. Analysis a. Proton ($^1$H) NMR

The purity of the silylated products was monitored using proton ($^1$H) NMR. The absence of a phenol proton peak at 9.1 ppm indicated complete silylation of the phenol functionalities. The spectrum shows clean, distinct peaks which integrate closely suggesting a high degree of purity for the silylated monomers.

EXAMPLE 2

Catalyst Concentration Effect

Catalyst concentration of 0.1, 0.2 and 0.3 mole percent were used to synthesize polymers with a stoichiometric offset of 30,000 g/mol. The predicted molecular weights calculated from the offset is shown in the column labeled Predicted $M_n$ (see Table 1). The number average molecular weights experimentally determined by GPC are shown in the column labeled Experimental $M_n$.

TABLE 1

Molecular Weight as a Function of Catalyst Concentration

| Catalyst Conc. (mole %) | Predicted $M_n$ (g/mol) | Experimental $M_n$ (g/mol)* | Extent of Reaction (%) |
| --- | --- | --- | --- |
| 0.1 | 29,581 | 8,420 | 96 |
| 0.2 | 30,152 | 11,900 | 98 |
| 0.3 | 30,304 | 33,300 | 100 |

*$M_n$ by GPC in NMP with 0.025% $P_2O_5$

The predicted and experimental molecular weights were compared to find the catalyst concentration that gave complete reaction. The two lower catalyst concentrations produced polymers with molecular weights that were lower than predicted by the stoichiometric offset. To drive the reaction to completion and obtain a polymer with a molecular weight that agreed with the stoichiometric offset, at least 0.3 mole percent catalyst was required. Visually, the catalyst concentration, at these levels, did not seem to affect the rate of reaction; the only visual difference between each polymer was the viscosity of the final polymer in the melt.

EXAMPLE 3

Molecular Weight Control

Using 0.3 mole percent catalyst, a series of polymers with different molecular weights were synthesized. Again, the stoichiometry offset of the monomers was used to calculate the predicted $M_n$ shown in the first column of Table 2. The number average molecular weights experimentally determined by GPC (Experimental $M_n$) agreed with the predicted molecular weights (see Table 2).

TABLE 2

Molecular Weights of Bis A PEPOs Using 0.3 mole Percent CsF

| Predicted $M_n$ (g/mol) | Experimental $M_n$ (g/mol) | MWD |
| --- | --- | --- |
| 30,304 | 33,300 | 2.2 |
| 29,000 | 22,600 | 2.4 |
| 6,216 | 6,700 | 1.6 |
| solution control | 30,900 | 2.2 |

*$M_n$ by GPC in NMP with 0.025% $P_2O_5$

This data supports the hypothesis that the molecular weights of polymers synthesized in the melt are controllable by Carother's Equation. A desired molecular weight can be targeted by offsetting the stoichiometry of the monomers. The molecular weight distributions shown in the column labeled MWD are close to 2.0 and characteristic of step growth polymerization.

EXAMPLE 4

Thermal Analysis

Table 3 shows the glass temperatures and 5 percent decomposition temperatures for a series of polymers.

TABLE 3

Glass Transition Temperatures and 5% Decomposition
Temperatures of Bis A PEPOS

| $M_n$ (g/mol) | Tg (° C.)** | 5% decomp. (° C.)+ |
|---|---|---|
| 33,000 | 194 | 496 |
| 22,600 | 189 | 500 |
| 6,760 | 163 | 476 |
| 30,900* | 198 | 505 |

*solution control
**DSC second heat 50–300° C.; 10° C./min + TGA 30–800° C. in air; 10° C./min The high molecular weight polymers, 33,000 g/mol and 22,600 g/mol, had comparable results to the solution control with respect to each thermal characteristic. Both values decreased for the 6,760 g/mol polymer.

The 6,760 g/mol polymer with the non-reactive phenyl endgroups did not show an increase the 5% decomposition temperature.

EXAMPLE 5

Spectroscopic Studies $^{13}$C NMR can also be used to determine number average molecular weight. Finding molecular weight by NMR relies on the carbons in the endgroups displaying peaks unique from the carbons in the backbone. A 3,610 g/mole phenylethynyl endcapped polymer was synthesized and quantitative 13C NMR was used to find its molelcular weight.

The peaks labeled x and y represent the ethynyl carbons and integrate to 1.56 and 1.70 respectively. The quaternary carbon peak is labeled z and integrates to 8.69. To calculate a more accurate molecular weight, the average integration value of the two ethynyl peaks, 1.63, is used. The NMR molecular weight calculation is below.

$X_n$=8.69/1.63/2=10.7×502.5 g/mol (molecular weight of repeat unit)=5,360 g/mol The NMR molecular weight is 1,750 g/mol higher than the GPC molecular weight. This comparison is inconclusive due to the inherent error in both the GPC and NMR methods. The spectrum shows some endgroup incorporation, but all chains may not have two ethynyl endgroups.

The examples demonstrate that Carother's Equation can be used to target a specific molecular weight for melt synthesized PEPOs with rapid to Bis A PEPO, for the polymer's actual molecular weight to agree with the molecular weight as calculated by the Carother's Equation, the concentration of CsF should preferably be at least 0.3 mole percent based on Si—Bis A. High purity of the silylated monomers along with a careful reaction procedure allow the stoichiometric offset to be calculated accurately. The glass transition temperatures and decomposition behavior of the melt synthesized polymers are comparable to solution synthesized polymers of the same molecular weight. Incorporation of endgroups on the Bis A PEP backbone is possible.

Typical reactors may be used. However, with more volatile silylated bisphenols such as, for example, 6F Bisphenol, parts may be placed further away from the heat source to keep the top of the reactor cooler.

All patents, publications, applications, and test methods mentioned above are hereby incorporated by reference.

Many variations of the present matter will suggest themselves to those skilled in the art in light of the above detailed description. All such obvious variations are within the patented scope of the appended claims.

What is claimed is:

1. A method for producing a poly ether phosphine oxide, said method comprising melt polymerizing reactants comprising
   (i) a trimethyl silyl derivative of a bisphenol and (ii) an activated aromatic dihalide, wherein (i), (ii), or (i) and (ii) is a phosphine oxide.

2. A method as defined in claim 1, wherein said polymerization is preformed in the presence of a catalyst.

3. A method as defined in claim 2, wherein said catalyst is CsF.

4. A method as defined in claim 1, wherein said polymerization is performed at a temperature gradient which peaks from about 50 to about 75° C. above the Tg of said poly ether phosphine oxide.

5. A method as defined in claim 1, wherein said polymerization is performed in the absence of a solvent.

6. A method as defined in claim 1, wherein said polymerization is performed in the absence of an inorganic base.

7. A method as defined in claim 1, wherein said reactants further comprise (iii) a trimethyl silyl derivative of a monophenol.

8. A method as defined in claim 1, wherein said bisphenol is selected from the group consisting of hydroquinone; 4,4'-oxydiphenol; bisphenol-A; biphenol; 4.4'-bis(hydroxy phenyl) sulfone; 4,4'-bis(hydroxy phenyl)phenyl phosphine oxide; 4,4'-bis(hydroxyphenyl) sulfide; or any combination of any of the foregoing.

9. A method as defined in claim 1, wherein said activated aromatic dihalide is selected from the group consisting of bis(4.4'-fluoro phenyl) phenyl phosphine oxide (BFPPO); 4,4'-dichloro diphenyl sulfone (DDS); or a combination thereof.

10. A method as defined in claim 10, wherein the weight ratio of BFPPO to DDS ranges from about 100:1 to about 5:95.

11. A method as defined in claim 2, wherein the amount of catalyst ranges from about 0.1 to about 1 mole % of the total mole % of the reactants.

12. A method as defined in claim 1, wherein the amounts of said reactants (i) and (ii) are stoichiometrically offset for control of the molecular weight of said poly ether phosphine oxide.

13. A method as defined in claim 1, wherein said melt polymerization results in a gaseous condensation by-product which is removed.

14. A method as defined in claim 13, wherein said gaseous by-product is removed by argon purge and vacuum.

15. A method for producing bisphenol A poly ether phosphine oxide, said method comprising melt polymerizing trimethyl silylated bisphenol A and bis (4,4'-fluorophenyl) phenyl phosphine oxide in the presence of cesium fluoride catalyst.

16. A method for producing 6F Bisphenol poly ether phosphine oxide, said method comprising melt polymerizing trimethyl silylated 6F bisphenol and bis (4,4'-fluorophenyl) phenyl phosphine oxide in the presence of cesium fluoride catalyst.

17. An ophthalmic lens comprising a poly ether phosphine oxide prepared by a method as defined in claim 1.

\* \* \* \* \*